Patented July 4, 1944

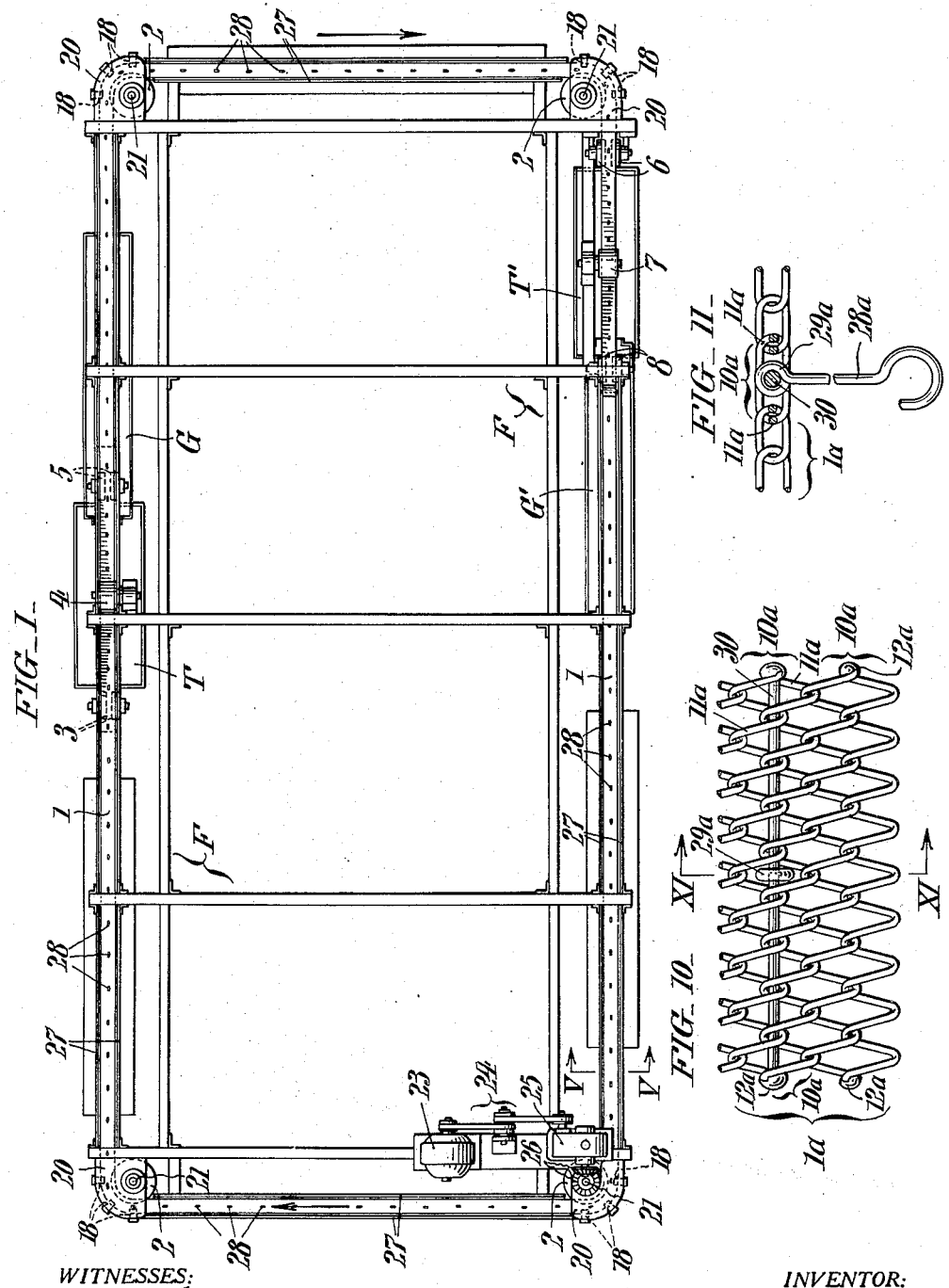

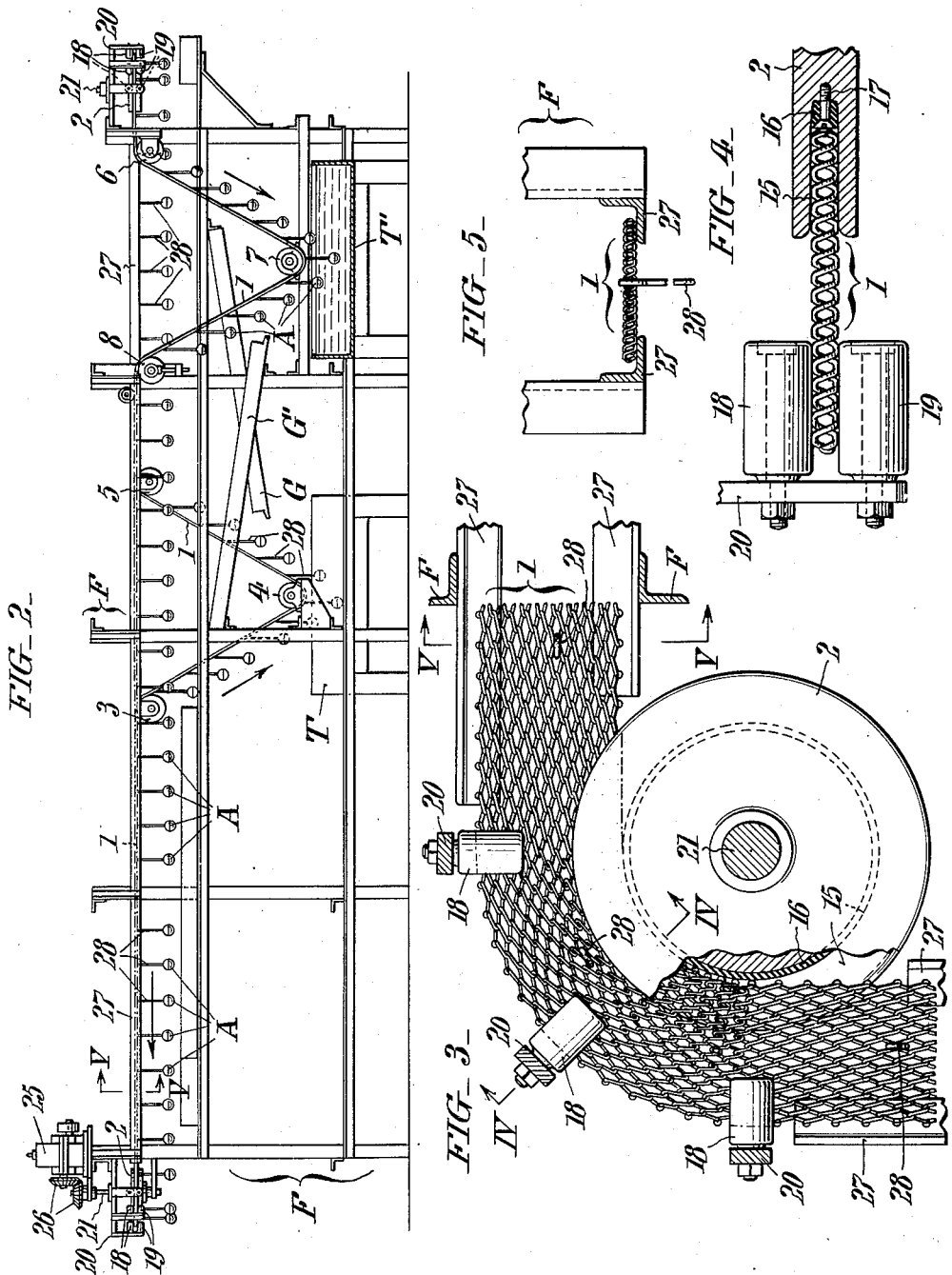

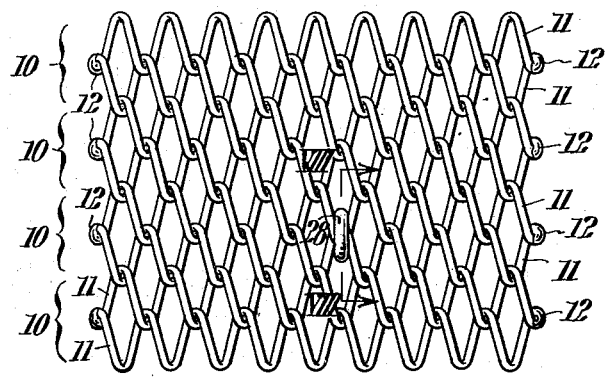
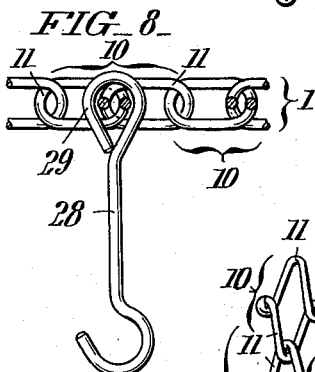
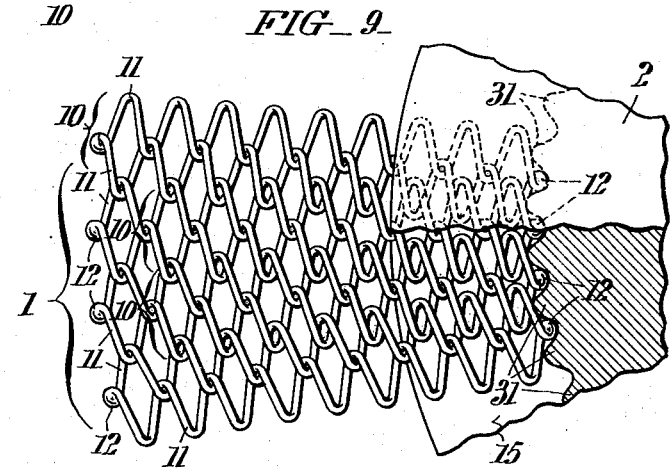
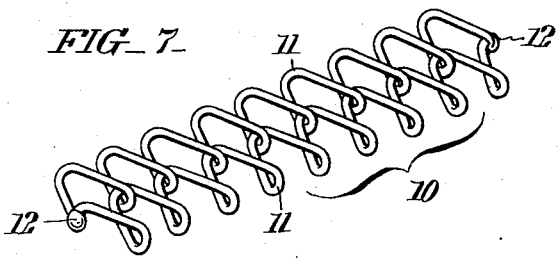

2,352,840

UNITED STATES PATENT OFFICE 2,352,840

CONVEYER SYSTEM

Harold E. Kleintop, Parkesburg, Pa., assignor to Korb-Pettit Wire Fabrics & Iron Works, Inc., Philadelphia, Pa., a corporation of Pennsylvania Application November 17, 1942, Serial No. 465,845

8 Claims. (Cl. 198—177)

This invention relates to conveyer systems and has reference more especially to conveyer systems in which the articles being transported are hung in suspension from a traveling carrier or carriers. In conveyer systems of the kind specially referred to, sprocket chains are ordinarily employed to serve as carriers.

The chief aim of my invention is to enable the use of relatively light wire belting in place of the heavier and more expensive sprocket chains heretofore used in such systems. This desideratum I realize in practice as later set forth in greater detail herein, through provision of a conveyer system involving a mesh belt which has the capacity to adapt itself to curvilinear travel in its own plane in passing about wheels which define its course of travel, and also involving means to prevent buckling of the belt at the wheels, as well as means for sustaining the belt against sagging under the weight of the suspended articles in the intervals between the wheels.

In connection with a conveyer belt having the above attributes, it is a further aim of my invention to make possible the attachment of suspension hangers in such a way that it will not interfere with the passage of the belt around the wheels.

Other objects and attendant advantages will appear from the following detailed description of the attached drawings; wherein Fig. 1 is a view in top plan of a paint applying apparatus with a conveyer system embodying my invention.

Fig. 2 shows the apparatus in side elevation.

Fig. 3 is a detail view in plan drawn to a larger scale and showing the belt conveyer in its travel around one of the course-defining wheels of the system.

Fig. 4 is a fragmentary detail section taken as indicated by the angled arrows IV—IV in Fig. 3.

Fig. 5 is a detail cross sectional view likewise on a larger scale, taken as indicated by the angled arrows V—V in Figs. 1-3 and showing how the conveyer is supported against sagging in the intervals between wheels.

Fig. 6 is a fragmentary detail view of the conveyer belt in plan showing the relative positions taken by its components in straight-away travel.

Fig. 7 is a perspective view of one of the belt components.

Fig. 8 is a detail sectional view taken as indicated by the angled arrows VIII—VIII in Fig. 6 showing one way in which article-supporting suspension elements are attached to the conveyer belt in accordance with my invention.

Fig. 9 is a view corresponding to Fig. 3 and showing a modified construction.

Fig. 10 is a detail view in plan like Fig. 6 showing an alternative type of suspension support and the manner in which it is attached to the conveyer belt; and Fig. 11 is a fragmentary detail sectional view taken as indicated by the angled arrows XI—XI in Fig. 10.

The paint applying apparatus herein illustrated in Figs. 1 and 2 for convenience of exemplifying one practical use of my improved conveyer system, has a structural iron framework F. As shown, the framework F is of oblong configuration in plan with troughs T and T' which are arranged lengthwise of its longer sides, said troughs containing paint into which articles A supported in suspension from the carrier belt 1 of the system are successively dipped. The carrier belt 1 is endless and travels in a horizontal plane perimetrically of the top of the framework F in the direction indicated by the arrows in Fig. 1, except in the region of the troughs T and T' where it is diverted downward as shown in Fig. 2. The excess paint dripping from the articles A at the regions where they emerge from the troughs T and T' is caught by inclined gutters G and G' and by them returned to said troughs. In the horizontal portion of its travel, the belt passes about vertical axis wheels 2 respectively at the upper corners of the framework F, while in deviating downward at the troughs T and T', it passes about the horizontal axis wheels 3, 4, 5 and 6, 7, 8, respectively.

From Fig. 6 it will be noted that the belt 1 consists of a plurality of interengaged transverse components 10, one of which is separately illustrated in perspective in Fig. 7. Each such component 10 is composed of a pair of flat spirals 11 of comparatively stout wire of which the convolutions are interlocked, said spirals lying in a straight common plane and being rigidly united at their contiguous ends as by welding as indicated at 12. By virtue of this construction, the components 10 are capable of taking radial positions relative to each other as instanced in Figs. 3 and 9 in passing about the wheels 2 which respectively lie in the plane of the belt 1 as will be seen from Fig. 4. As further shown in Figs. 3 and 4, the wheels 2 are provided with comparatively deep narrow circumferential grooves 15 into which the near edge of the belt 1 engages with a snug working fit. An annular lining 16 of compressible material like rubber is secured by one or more screws 17 in the bottom of the groove 15 of each wheel 2 for better traction engagement with the belt edge.

In order to prevent the belt 1 from buckling at the wheels 2, I provide for the support and guidance of the other or outer edge of said belt. The means shown for this purpose comprises, as instanced in Figs. 3 and 4, pairs of freely-revolving vertically-spaced rollers 18, 19 which are disposed at suitable intervals circumferentially of the wheel 2, the extent of overlap of said rollers and wheels upon the belt being such as to leave the mid portion of the latter free. As best seen in Figs. 1 and 3, the rollers 18 and 19 are carried by brackets 20 secured to the framework F at its upper corners, which brackets 20 also afford bearings for the shafts 21 of the wheels 2. Any suitable means may be utilized to drive the belt 1, such for example as an electric motor 23 (Figs. 1 and 2) with associated belting 24 and a speed reduction unit 25 which, through bevel gears 26, is connected to the shaft 21 of one of the wheels 2.

In the intervals between wheels, the straight horizontal runs of the conveyer belt are sustained against sagging by angle iron ledges 27 secured to the framework F, see Figs. 1–3 and 5. As shown, the horizontal flanges of the angle irons 27 underreach the side edges of the belt 1, the extent of lap being such here also that the medial portion of said belt is free. If desired, a series of rollers may be used in lieu of the angle irons to support each side edge of the belt between wheels.

Attached to the belt 1 at the center at intervals along its length are suspension elements in the form of wire hooks 28 on which the articles A are hung. As detailed in Fig. 8, each such suspension hook has an eye 29 at the top loosely engaged around the juncture between a pair of contiguous interlocking convolutions of the spirals 11 constituting one of the transverse components 10 of the belt 1.

In the alternative embodiment shown in Figs. 10 and 11, the eye 29a of the suspension hook 28a is engaged about a wire strand 30 passed through the interlocking convolutions of the spirals 11a of the belt component 10a and secured at its ends in the welds at 12a.

If desired or found more convenient in practice, the wheels 2 may be provided with teeth 31 (Fig. 9) in lieu of resilient linings previously described, for engaging the edge of the belt 1 between the welds 12.

While I have herein illustrated and described my improved conveyer system in connection with a paint-applying apparatus, it is to be understood that the same is not limited to such use, since by suitable further modifications within the scope of the appended claims it can be embodied, without sacrifice of any of the advantages hereinbefore pointed out, in other types of apparatus or machines. For example, it may be employed in connection with drying machines for carrying the materials through an enclosure in which heated air is circulated. Other like applications will readily suggest themselves in practice.

In any event, the employment of a flat endless conveyer such as I have devised, is advantageous further in that it can be loaded and unloaded at a single point or station.

Having thus described my invention, I claim:

1. A conveyer system including a flat belt with transversely extending components interengaged for capacity to take angular positions relative to each other in rounding curves; a wheel in the plane of the belt having a circumferential receiving groove for one edge of the belt; and guides means for engaging the other edge of the belt from opposite sides to prevent buckling of said belt as it passes about the wheel.

2. A conveyer system according to claim 1, wherein the wheel has a lining of rubber or the like lodged in the bottom of its circumferential groove for tractive engagement with the belt edge.

3. A conveyer system according to claim 1, wherein each component of the belt consists of a pair of interlocking spirals of wire which are disposed in a straight plane and which have their contiguous ends rigidly united.

4. A conveyer system according to claim 1, in which the guide means comprises pairs of spaced radially arranged rollers positioned at intervals circumferentially of the wheel.

5. A conveyer system according to claim 1, wherein each component of the belt consists of a pair of interlocking spirals of wire which are disposed in a straight plane and which have their contiguous ends rigidly united; and wherein the bottom of the circumferential groove of the wheel is formed with teeth for engaging in the intervals between the united ends of adjacent components of the belt along its wheel-contacting edge.

6. A conveyer system including a flat belt with transversely extending components interengaged for capacity to take angular positions relative to each other in rounding curves; a vertical axis wheel with a circumferential groove engaged by one side edge of the belt to confine it to a course of travel in a horizontal plane; and guide means for engaging the other edge of the belt from opposite sides to prevent buckling of said belt as it passes about the wheel.

7. A conveyer system including a flat endless belt with transversely extending components interengaged for capacity to take angular positions relative to each other in rounding curves; means for confining the belt to a course of travel in a horizontal plane including a plurality of vertical axis wheels each with a circumferential groove to engage and guide one side edge of the belt; guide means for engaging the other edge of the belt from above and below to prevent the buckling of the belt as it passes about the respective wheels; and ledges for sustaining the opposite edges of the straight runs of said belt in the intervals between wheels; and means for driving one of said wheels.

8. A conveyer system according to claim 6, in which the belt is medially provided at longitudinal intervals with means for supporting articles in suspension.

HAROLD E. KLEINTOP.